T. E. MURRAY, Jr., AND J. B. MURRAY.
METHOD OF PRODUCING A PLURALITY OF OBJECTS OF SHEET METAL.
APPLICATION FILED OCT. 8, 1919.

1,368,045.

Patented Feb. 8, 1921.

Inventors
Thomas E. Murray Jr
Joseph B. Murray

By
their Attorney

UNITED STATES PATENT OFFICE.

THOMAS E. MURRAY, JR., AND JOSEPH B. MURRAY, OF BROOKLYN, NEW YORK.

METHOD OF PRODUCING A PLURALITY OF OBJECTS OF SHEET METAL.

1,368,045.                    Specification of Letters Patent.        Patented Feb. 8, 1921.

Application filed October 8, 1919. Serial No. 329,354.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Producing a Plurality of Objects of Sheet Metal, of which the following is a specification.

The invention is a method of producing a plurality of objects of sheet metal, involving the use of but one electrical welding operation, and consists in the steps more particularly set forth in the claims.

In the accompanying drawing—

Figure 1:
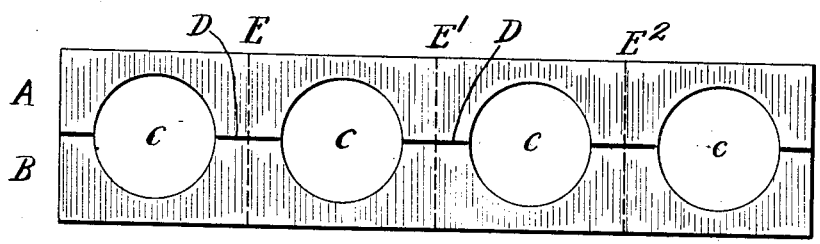
Figure 2:
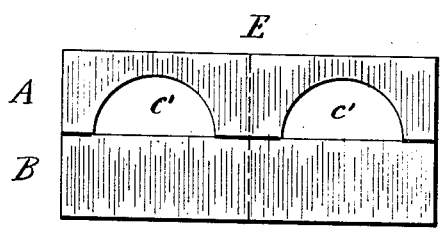
Figure 3:
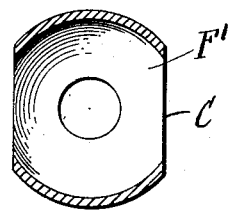
Figure 4:
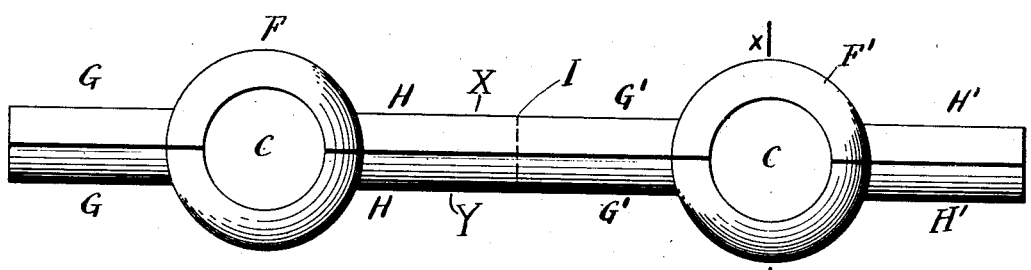

Figure 1 shows two flat plates welded together edge to edge exhibiting a series of joints separated by non-welded intervals—here circular openings—also showing the transverse lines of division for separating said welded plates into a number of objects, and also showing semi-circular registering recesses made in the edges of both plates. Fig. 2 shows two plates welded edge to edge with recesses in the edge of but one of said plates. Fig. 3 is a section on the line $x$, $x$ of Fig. 4. Fig. 4 is an elevation of two housings for transmission gear, illustrating the application of our method to the production thereof.

Similar letters of reference indicate like parts.

Referring first to Fig. 1, along the longitudinal edges of two metal plates A, B are first formed a series of semi-circular recesses which, when the edges of said plates are placed in contact with the recesses registering, produce a succession of circular openings C. The welding current being established, the joints D adjacent to or intervening between the circular openings C are all formed simultaneously, and the completed object is then a substantially integral plate pierced by the series of circular openings. If from this single object we wish to produce a number of precisely similar objects, each with a single circular opening C, we cut the plate transversely across the joints D at the middle points thereof on the lines E, E', $E^2$; or if we desire to make separate objects dissimilar in that some may contain more openings than others, obviously we may effect this by suitably disposing the transverse cuts: thus, instead of cutting the object at every transverse line, we may cut it, for example, only along one transverse line, as $E^2$, in which case one division will have one, and the other three, openings C. Instead of making the recesses in both edges of the plates, we may make them in only one edge, as shown in Fig. 2 at C', the unrecessed edge of one plate being welded to the recessed edge of the other plate.

Turning now to the specific application of our invention to the production of an automobile gear housing, in Figs. 3 and 4 we illustrate a housing having a globular middle portion F, with openings C in its opposite walls. and two straight tubular portions G, H integral with and on opposite sides thereof. We form two of these housings simultaneously, as follows:

We produce by stamping or pressing from sheet metal, two longitudinal half sections X, Y, each section comprising two semi-globular portions F, F' and four straight semi-tubular portions G, H, G', H' of equal length adjacent thereto, the semi-tubular portions H, G' intervening between semi-globular portions F, F' being integral. Said two half sections X, Y are placed with their edges in registry, and all of said edges are then electrically welded together at a single welding operation. The two housings are then cut apart transversely between the said tubular portions H, G', as shown at I.

We claim:

1. The method of producing a plurality of objects of sheet metal, which consists first in producing from two elongated bodies of sheet metal disposed edge to edge, a single body having a plurality of joints at said edges separated by openings and formed by first producing recesses in the edges of said bodies and electrically welding together simultaneously the contacting edge surfaces of said bodies between said recesses, and then transversely dividing said welded single body into a plurality of divisions.

2. The method of producing a plurality of objects of sheet metal, each having an opening, which consists first in producing from two elongated bodies of sheet metal disposed edge to edge, a single body having a plurality of joints at said edges separated by openings and formed by first producing recesses in the edges of said bodies, the recesses in one body registering with those in the other body, and electrically welding together simultaneously the contacting edge surfaces of said bodies between said recesses, and then transversely dividing said welded body between said openings into a plurality of divisions.

3. The method of producing a plurality of objects of sheet metal, each having a predetermined number of openings, which consists in first producing from two elongated bodies disposed edge to edge, a single body having a plurality of joints at said edges separated by openings and formed by first producing recesses in the edges of said bodies, the recesses in one body registering with those in the other body, and electrically welding together simultaneously the contacting edge surfaces of said bodies between said recesses, and then dividing said welded body into a plurality of divisions, each containing a predetermined number of openings by transversely cutting said body across said joints.

4. The method of producing foraminous metal plates, gratings or the like, which consists in forming a plurality of recesses in the edge of a metal plate, and then electrically welding simultaneously the portions of said edge between said recesses to a second plate and thereby closing said recesses.

5. The method of producing foraminous metal plates, gratings or the like, which consists in, first, forming two plates each with a plurality of recesses in its edge, second, placing the portions of said edges between said recesses in contact, and third, electrically welding together simultaneously said contacting edge portions.

In testimony whereof we have affixed our signatures in presence of two witnesses.

THOMAS E. MURRAY, Jr.
JOSEPH B. MURRAY.

Witnesses:
 GERTRUDE T. PORTER,
 MAY T. McGARRY.